US012774032B2

(12) United States Patent
Watson et al.

(10) Patent No.: US 12,774,032 B2

(45) Date of Patent: Oct. 27, 2026

(54) UNDERBODY COVER FOR COMPLIANCE WITH VEHICLE IMPACT PERFORMANCE

(71) Applicant: Toyota Motor Engineering & Manufacturing North America, Inc., Plano, TX (US)

(72) Inventors: Skylar C. Watson, Williamston, MI (US); Taylor R. Farish, Waxahachie, TX (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 308 days.

(21) Appl. No.: 18/672,477

(22) Filed: May 23, 2024

(65) Prior Publication Data

US 2025/0360965 A1 Nov. 27, 2025

(51) Int. Cl.
*B62D 21/15* (2006.01)

(52) U.S. Cl.
CPC .................................... *B62D 21/15* (2013.01)

(58) Field of Classification Search
CPC .... B62D 21/15; B62D 21/152; B62D 21/155; B62D 21/10; B62D 35/02; F41H 7/042
USPC .................... 296/187.08, 187.09, 29, 193.07
See application file for complete search history.

(56) References Cited

U.S. PATENT DOCUMENTS 5,605,353 A * 2/1997 Moss ..................... B62D 21/09 188/376
6,109,654 A 8/2000 Yamamoto et al.
7,380,829 B2 * 6/2008 Kishima .............. B62D 21/155 296/187.03
7,883,113 B2 2/2011 Yatsuda
8,794,646 B1 * 8/2014 Onishi ..................... B60G 7/02 296/203.02
9,586,537 B2 * 3/2017 Abe .................... B60R 13/0861
9,944,322 B2 * 4/2018 Baccouche ............ B62D 21/15
2012/0056447 A1 * 3/2012 Yoshida ............... B62D 21/155 296/193.09

FOREIGN PATENT DOCUMENTS

DE 102014112528 A1 * 3/2015 ............ B62D 35/02

* cited by examiner

*Primary Examiner* — Wenwei Zhuo

(74) *Attorney, Agent, or Firm* — Christopher G. Darrow; Darrow Mustafa PC

(57) ABSTRACT

Various embodiments described herein relate to vehicular underbody covers that comply with vehicular impact performance. An underbody cover for a vehicle includes a plate body that attaches to an underbody of a vehicle. The underbody includes a first crossbeam and a second crossbeam spaced from the first crossbeam in a longitudinal direction of the vehicle. The plate body defines a first end that attaches to the first crossbeam and a second end opposite the first end that attaches to the second crossbeam. The underbody cover also includes a first attachment component that rigidly attaches the first end to the first crossbeam and a second attachment component that movably attaches the second end to the second crossbeam and allows the second end to disengage from the second crossbeam in an impact involving the vehicle, thereby preventing transmission to the vehicle through the underbody cover of a load from the impact.

20 Claims, 7 Drawing Sheets

UNDERBODY COVER FOR COMPLIANCE WITH VEHICLE IMPACT PERFORMANCE

TECHNICAL FIELD

The subject matter described herein relates, in general, to underbody covers for vehicles and, more particularly, to underbody covers that comply with vehicular impact performance.

BACKGROUND

Some vehicles include underbodies having frames that include combinations of rigidly interconnected frame rails and crossbeams. Among other purposes, the frame rails and crossbeams serve to provide structural support for other components of the vehicle, such as rigid body panels, wheels, gas tanks, drivetrain components, etc. In some instances, the underbody is exposed underneath the vehicle. In other words, in some instances, the underbody, including portions of the frame rails, crossbeams, and components supported by the frame rails and crossbeams, may be exposed to an external environment of the vehicle. In such instances, the components supported by the frame rails and crossbeams may suffer damage from weather conditions, rocky terrain, etc.

SUMMARY

In one arrangement, example systems relate to underbody covers for vehicles that comply with the impact performance of the vehicles. In other words, the underbody covers do not significantly affect the impact performance of the vehicles. As mentioned above, some vehicles include underbodies having frames including combinations of rigidly interconnected frame rails and crossbeams. As one exemplary arrangement, an underbody cover is attached to a frame of a vehicle, for example, to the crossbeams, and provides protection for one or more components supported by the frame. For example, the underbody cover can provide protection against weather and/or terrain to a catalytic converter supported by the frame.

In some instances, the interconnection of the frame rails and crossbeams governs the behavior of the vehicle in an impact involving the vehicle. For example, as described herein, a vehicle may be designed with a first crossbeam and a second crossbeam such that, in an impact involving the vehicle, the first crossbeam moves first, and the second crossbeam moves subsequently. Movement of the first crossbeam and second crossbeam dictate, in some cases, the manner in which the remainder of the vehicle, including the remainder of the frame, absorbs a load transmitted during the impact. However, some underbody covers, when attached to the frame, may negatively affect load transmission in an impact. Accordingly, the arrangements described herein provide an underbody cover for a vehicle that complies with the impact performance of the vehicle.

As mentioned above, a vehicle frame may include a first crossbeam and a second crossbeam that move iteratively during an impact. In one configuration, the underbody cover is rigidly attached to the first crossbeam such that, during an impact, the underbody cover moves together with the first crossbeam. Moreover, in one configuration, the underbody cover is movably attached to the second crossbeam such that, during an impact, the underbody cover moves with respect to the second crossbeam, causing the underbody cover to disengage from the second crossbeam. Disengagement of the underbody cover from the second crossbeam, in one arrangement, prevents the underbody cover from transmitting the load experienced by the first crossbeam to the second crossbeam and/or the remainder of the frame. Accordingly, disengagement of the underbody cover from the second crossbeam facilitates compliance of the underbody cover with the impact performance of the vehicle.

In one arrangement, the underbody cover is rigidly attached to the first crossbeam by an attachment plate that is attached to the first crossbeam. Additionally or alternatively, the underbody cover is rigidly attached to the first crossbeam using a hook that wraps around at least a portion of the first crossbeam such that movement of the first crossbeam in an impact causes the first crossbeam to contact the hook and subsequently move the underbody cover.

In one arrangement, the underbody cover is movably attached to the second crossbeam using one or more keyhole fasteners. In one example, the keyhole fastener(s) include a keyhole aperture defined by the underbody cover and a fastener that attaches the underbody cover to the second crossbeam. The keyhole aperture, in one arrangement, includes a slot and a keyhole. In such arrangement, the underbody cover is attached to the second crossbeam by the fastener through the slot such that, when the load exceeds a predetermined amount, the underbody cover moves with respect to the fastener and slides so that the fastener is aligned with the keyhole, thereby permitting the underbody to move away from the fastener and disengage from the second crossbeam.

Additionally or alternatively, the underbody cover is movably attached to the second crossbeam using one or more break-away fasteners. The break-away fastener(s), in one arrangement, include a tab and a bridge connecting the tab to the underbody cover. The tab is connected to the second crossbeam such that, in an impact, the underbody cover fractures at the bridge and permits disengagement of the underbody cover from the second crossbeam.

In additional arrangements, the underbody cover includes further features that facilitate its disengagement from the frame. For example, in one arrangement, the underbody cover includes a ramp located between the first crossbeam and the second crossbeam. The ramp, in one configuration, slopes toward the second crossbeam in a downward direction with respect to the vehicle such that, when the underbody cover disengages from the second crossbeam, the second crossbeam pushes the underbody cover away from the underbody along the ramp as the underbody moves together with the first crossbeam. In another example, the underbody cover includes a crease between the first crossbeam and the second crossbeam that has an increased rigidity with respect to a rigidity of a remainder of the underbody cover. In this example, in an impact, the underbody cover crumples along the crease and deforms in a direction away from the underbody.

Accordingly, the arrangements have the benefit of providing a vehicular underbody cover that complies with and does not significantly affect impact performance requirements for vehicles. In addition to this benefit, the underbody cover also provides the advantage of protecting one or more vehicle components supported by the frame, such as a catalytic converter, during normal use of the vehicle. In these instances, features of the underbody cover provide the advantage of rigidly attaching the underbody cover to the frame during normal use to provide such protection, while also complying with impact performance requirements during an impact.

In one embodiment, an underbody cover includes a plate body that attaches to an underbody of a vehicle. The underbody includes a first crossbeam and a second crossbeam spaced from the first crossbeam in a longitudinal direction of the vehicle. The plate body defines a first end that attaches to the first crossbeam and a second end opposite the first end that attaches to the second crossbeam. The underbody cover also includes a first attachment component that rigidly attaches the first end to the first crossbeam and a second attachment component that movably attaches the second end to the second crossbeam and allows the second end to disengage from the second crossbeam in an impact involving the vehicle, thereby preventing transmission to the vehicle through the underbody cover of a load from the impact.

In another embodiment, an underbody cover includes a plate body that attaches to an underbody of a vehicle. The underbody includes a first crossbeam and a second crossbeam spaced from the first crossbeam in a longitudinal direction of the vehicle. The plate body defines a first end that attaches to the first crossbeam and a second end opposite the first end that attaches to the second crossbeam. The underbody cover also includes a first attachment component that rigidly attaches the first end to the first crossbeam and a second attachment component that movably attaches the second end to the second crossbeam and allows the second end to disengage from the second crossbeam. The second attachment component includes a keyhole fastener including a keyhole aperture defining a keyhole and a slot. The second end is connected to the second crossbeam by a fastener through the slot. The second attachment component also includes a break-away fastener including a tab connected to the second crossbeam and a bridge connecting the tab to the plate body. In an impact involving the vehicle, the second end is pushed by the plate body by movement of the first crossbeam such that the bridge fractures and permits disengagement of the second end from the second crossbeam, thereby preventing transmission to the vehicle through the underbody cover of a load from the impact.

In yet another embodiment, an underbody for a vehicle includes a pair of lateral crossbeams including a first crossbeam and a second crossbeam spaced from the first crossbeam in a longitudinal direction of the vehicle. The underbody also includes a pair of longitudinal frame rails each defining a buckle section located between the first crossbeam and the second crossbeam. The underbody also includes a plate body that attaches to the underbody between the longitudinal frame rails and between the lateral crossbeams. The plate body defines a first end that attaches to the first crossbeam and a second end opposite the first end that attaches to the second crossbeam. The plate body includes a first attachment component that rigidly attaches the first end to the first crossbeam and a second attachment component that movably attaches the second end to the second crossbeam and allows the second end to disengage from the second crossbeam in an impact involving the vehicle, thereby preventing transmission to the vehicle through the underbody cover of a load from the impact.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
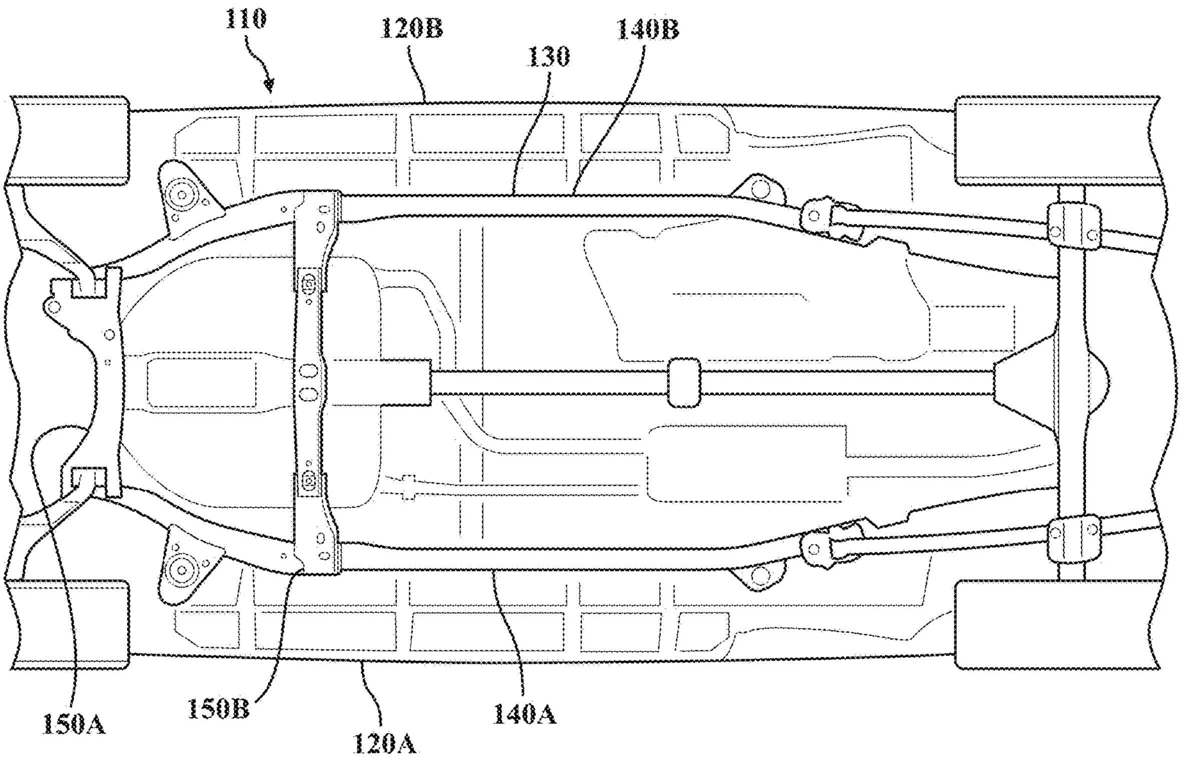
FIG. 1 illustrates one example of an underbody of a vehicle.

Example embodiments relate to underbody covers that do not significantly affect impact performance of a vehicle. As mentioned above, some vehicles include underbodies having frames including combinations of rigidly interconnected frame rails and crossbeams. In one exemplary arrangement, an underbody cover is attached to a frame of a vehicle at, for example, the crossbeams, and provides protection for one or more components supported by the frame.

The interconnection of the frame rails and crossbeams may govern the behavior of the vehicle in an impact. For example, a vehicle may be designed with a first crossbeam and a second crossbeam such that, in an impact involving the vehicle, the first crossbeam moves first, and the second crossbeam moves subsequently. Movement of the first crossbeam and second crossbeam dictate, in some cases, the manner in which the remainder of the vehicle, including the remainder of the frame, absorbs a load transmitted during the impact. In one arrangement, the underbody cover is rigidly attached to the first crossbeam such that, during an impact, the underbody cover moves together with the first crossbeam. Moreover, the underbody cover is, for example, movably attached to the second crossbeam such that, during an impact, the underbody cover moves with respect to the second crossbeam, causing the underbody cover to disengage from the second crossbeam. Disengagement of the underbody cover from the second crossbeam prevents the underbody cover from transmitting the load experienced by the first crossbeam to the second crossbeam and/or the remainder of the frame. Accordingly, disengagement of the underbody cover from the second crossbeam facilitates the impact performance of the vehicle.

In one arrangement, the underbody cover is rigidly attached to the first crossbeam such that movement of the first crossbeam in an impact causes the first crossbeam to subsequently move the underbody cover. The underbody cover, in some instances, is movably attached to the second crossbeam using one or more attachment components that permit disengagement of the underbody cover from the second crossbeam. The attachment components include, in some examples, keyhole fasteners and/or break-away fasteners that permit the underbody cover to become disengaged from the second end when a load from an impact involving the vehicle exceeds a predetermined amount.

In additional configurations, the underbody cover includes further features that facilitate disengagement from the frame. For example, in one arrangement, the underbody cover includes a ramp located between the first crossbeam and the second crossbeam. The ramp, in one arrangement, slopes toward the second crossbeam in a downward direction with respect to the vehicle such that, when the underbody cover disengages from the second crossbeam, the second crossbeam pushes the underbody cover away from the underbody along the ramp as the underbody moves together with the first crossbeam. In another example, the underbody cover includes a crease between the first crossbeam and the second crossbeam that has an increased rigidity with respect to a rigidity of a remainder of the underbody cover. In this example, in an impact, the underbody cover crumples along the crease and deforms in a direction away from the underbody.

Accordingly, the underbody cover, by way of the rigid and movable attachment components, as well as, in some instances, the ramp and the crease, provides the advantage of protecting one or more vehicle components supported by the frame while not significantly affecting impact performance of vehicles. More specifically, the attachment components provide the advantage of rigidly attaching the underbody cover to the frame during normal use to provide such protection, while also disengaging from the frame to prevent transmission to the frame of a load during an impact involving the vehicle. Further details of the performance of the underbody cover will be described in further detail below with reference to FIGS. 1-6C.

Referring now to FIG. 1, part of a representative vehicle is shown. More specifically, FIG. 1 shows an exemplary underbody 110 of a vehicle. As shown, the vehicle is a pickup truck, but the vehicle can be another type of vehicle such as a sedan, SUV, semi-truck, etc. The underbody 110 defines a first side 120A and a second side 120B. In one arrangement, the vehicle is a left-hand drive vehicle in which the first side 120A is a driver's side of the vehicle, and the second side 120B is a passenger's side of the vehicle. However, in other arrangements, the first side 120A is the passenger's side, and the second side 120B is the driver's side. Between the first side 120A and the second side 120B, in one example, the underbody 110 includes a frame 130. In one or more instances, the frame 130 is a rigid configuration of frame members that provide structural support to the remainder of the vehicle.

In one configuration, the frame members 140 include frame rails 140 and crossbeams 150. For example, the frame 130 includes frame rails 140 that extend substantially longitudinally with respect to the vehicle and crossbeams 150 that are connected to the frame rails 140 extending substantially laterally with respect to the vehicle. In some instances, the crossbeams 150 are connected substantially perpendicularly to the frame rails 140. In the arrangement shown, the frame rails 140 include a first frame rail 140A located on the first side 120A and a second frame rail 140B located on the second side 120B. The first frame rail 140A and the second frame rail 140B are spaced apart from each other with respect to the lateral direction of the vehicle. Moreover, in the arrangement shown, the crossbeams 150 include a first crossbeam 150A located adjacent to the fore of the vehicle and a second crossbeam 150B located away from the first crossbeam 150A with respect to the vehicle. In some instances, the second crossbeam 150B is located adjacent to the aft of the vehicle. It should be understood that the frame rails 140 and the crossbeams 150 can be located and configured in other arrangements, and the frame 130 can include additional frame rails and crossbeams to those that are pictured. Moreover, in some configurations, the first crossbeam 150A can be generally located toward the aft of the vehicle while the second crossbeam 150B is generally away from the first crossbeam 150A toward the fore of the vehicle.

In some instances, the frame 130 is designed to perform in a specific manner when the vehicle is involved in an impact. More specifically, the frame 130 can be designed to transmit load from an impact in a specific manner. For example, when the vehicle is involved in a front impact (e.g., the fore of the vehicle collides with another object), the first crossbeam 150A moves first in a direction toward the aft of the vehicle, thereby transmitting the load to the second crossbeam 150B, which moves second after the first crossbeam 150A toward the aft of the vehicle. Designing the frame 130 in this manner can help protect occupants of the vehicle when the vehicle is involved in a front impact. This configuration of frame members is thus advantageous to implement for large and/or heavy passenger vehicles that may be more susceptible to front impacts. Moreover, when configured in this manner, the frame 130 members 140 can also be advantageous to implement for vehicles with cargo space to the rear of the vehicle, for example, pickup trucks and/or trailers, as beds of pickup trucks and cargo trailers may help absorb rear impacts, so it may be more advantageous to provide additional impact protection at the fore of the vehicle.

In other arrangements, the crossbeams 150 can be oriented in an opposite configuration than that shown in FIG. 1. For example, the first crossbeam 150A and the second crossbeam 150B can be oriented in a substantially mirror image along a central, lateral axis of the vehicle. In such a configuration, the first crossbeam 150A is located toward the aft of the vehicle while the second crossbeam 150B is located behind the first crossbeam 150A toward the fore of the vehicle. Accordingly, when the vehicle is involved in a rear impact (e.g., the aft of the vehicle collides with another object or another object rear-ends the vehicle), the first crossbeam 150A moves first, and the second crossbeam 150B moves second. Designing the frame 130 in this manner can help protect occupants of the vehicle when the vehicle is involved in a rear impact. This configuration of frame members is thus advantageous to implement for small and/or lightweight passenger vehicles that may be more susceptible to damage in a rear impact.

In general, as mentioned above, the frame 130 provides structural support for one or more vehicle components. In one example, the frame 130 can support vehicle components such as catalytic converters, gas tanks, exhaust systems, and/or other components typically housed within or near the underbody 110. In some instances, such components may suffer damage, for example, due to contact of the component with a ground surface (for example, while off-roading) and/or due to exposure to weather conditions, among other instances of damage. Accordingly, it is advantageous to provide an underbody cover 200 for the vehicle that serves to protect such vehicle components, among serving other purposes described in further detail below. As also described in further detail below, the underbody cover 200 is designed so that it does not significantly affect the impact performance of the vehicle.

Figure 2A:
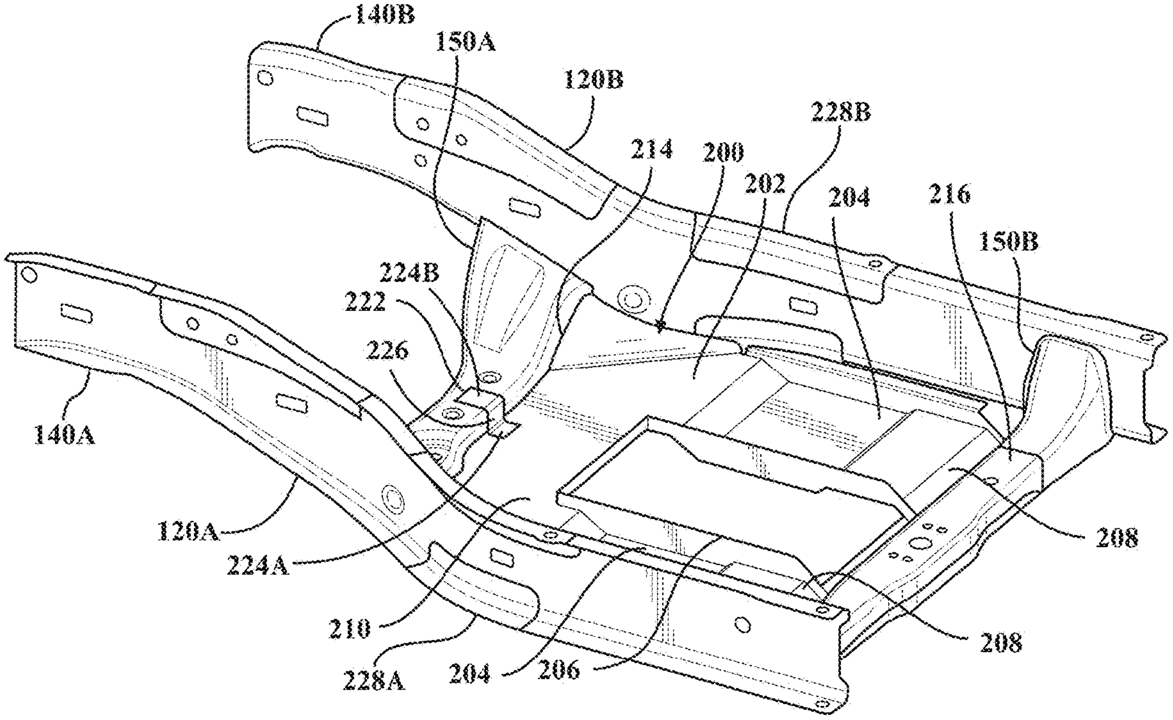
FIG. 2A illustrates one example of a topside of an underbody cover for the vehicle.
Figure 2B:
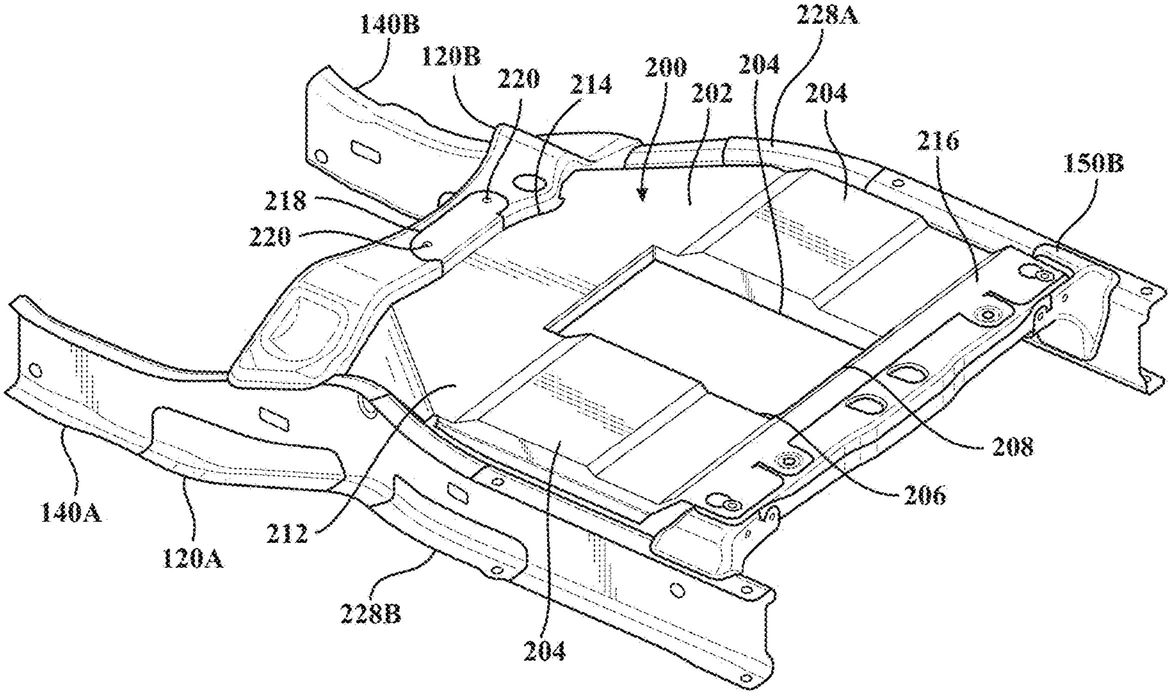
FIG. 2B illustrates one example of an underside of the underbody cover.

Referring now to FIGS. 2A and 2B, one example of an underbody cover 200 is shown. As mentioned above, the underbody cover 200, when attached to the frame 130, covers and protects one or more vehicle components, such as a catalytic converter or exhaust system of the vehicle. In other implementations, the underbody cover 200 can also function as a skid plate that helps the vehicle to skid over a crown in the road, for example, while off-roading. Additionally, as mentioned above, the underbody cover 200 is designed so that it complies with the impact performance of the vehicle. In other words, the underbody cover 200 is designed to not significantly affect the impact performance of the vehicle. It should be noted that the underbody cover 200 is shown attached to a frame 130 that is arranged with the first crossbeam 150A located toward the fore of the vehicle and the second crossbeam 150B located away from the first crossbeam 150A with respect to the longitudinal direction of the vehicle. However, when the crossbeams 150 are arranged in an opposite configuration, as described above, the underbody cover 200 may be arranged in an opposite configuration as well (e.g., the underbody cover 200 may be arranged in a mirrored orientation as shown in FIGS. 2A and 2B with respect to a central, lateral axis of the vehicle).

Figure 3A:
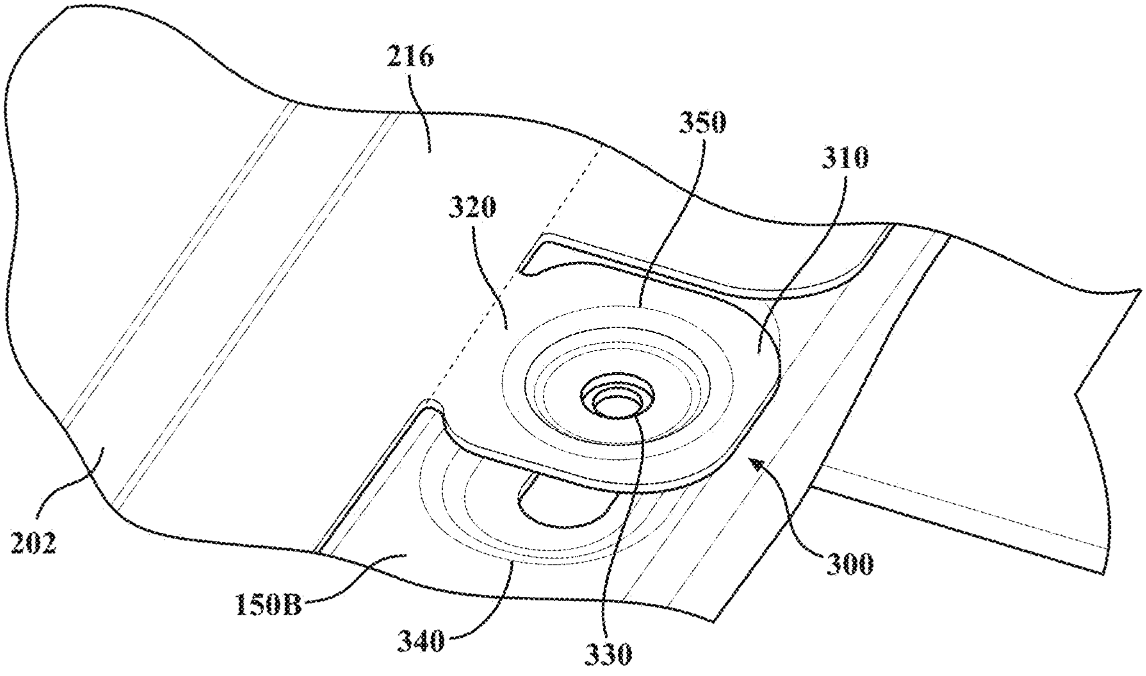
FIG. 3A illustrates one example of a break-away fastener in an engaged configuration.
Figure 3B:
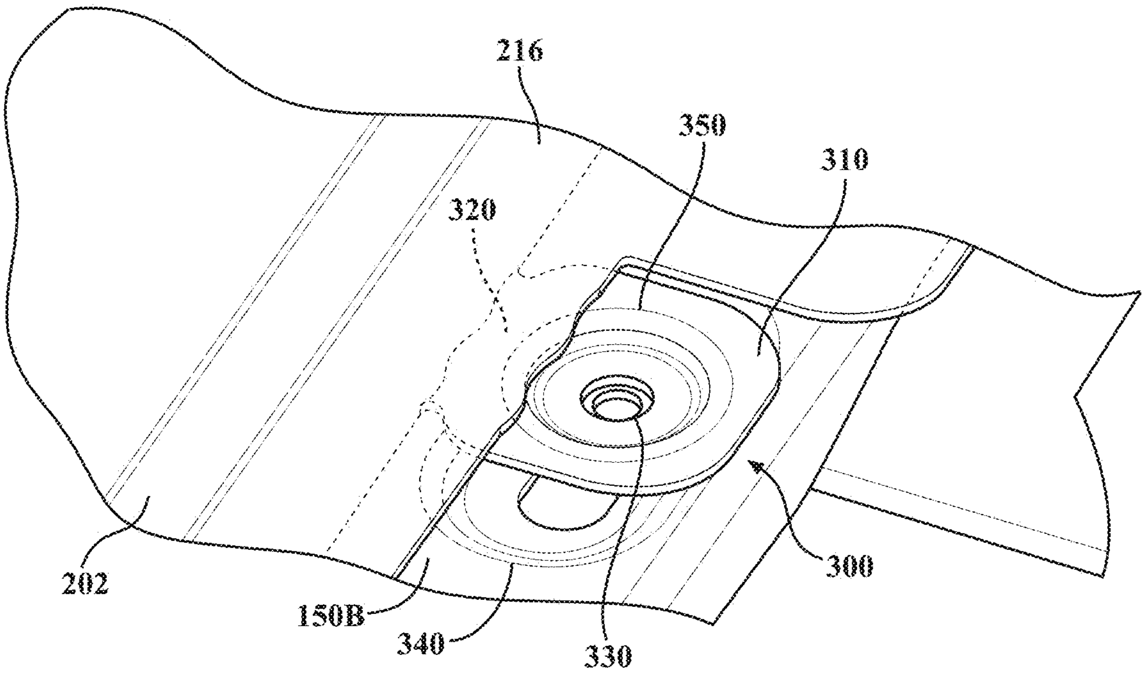
FIG. 3B illustrates one example of the break-away fastener in a disengaged configuration.

With continued reference to FIGS. 2A and 3B, the underbody cover 200, in one arrangement, includes a plate body 202. The plate body 202 has a generally flat, plate-like construction that spans at least a portion of the underbody 110. In one configuration, the plate body 202 has various constructional details, such as bends, ramps, openings, edges, etc., that serve various purposes. For example, the plate body 202 defines tray-like portions 204 that support and house catalytic converters. In another example, the plate body 202 defines an opening 206 that provides a space for one or more transmission components of the vehicle. In yet another example, the plate body 202 defines a ramp 208 between the first crossbeam 150A and the second crossbeam 150B that is a sloped portion of the plate body 202 near the second crossbeam 150B. The ramp 208 will be described in further detail below in connection with FIG. 5.

The plate body 202, in one example, has a topside 210 facing up toward the vehicle and an underside 212 facing down toward the ground. The plate body 202, in one arrangement, is located generally between the frame rails 140 and the crossbeams 150. The plate body 202 attaches to the first crossbeam 150A and the second crossbeam 150B. In one example, the plate body 202 may also attach to the first frame rail 140A and/or the second frame rail 140B. To attach the plate body 202 to the crossbeams 150, the underbody cover 200, in one configuration, includes a first end 214 that attaches the plate body 202 to the first crossbeam 150A and a second end 216 that attaches the plate body 202 to the second crossbeam 150B. In the arrangement shown, the first end 214 is located toward the fore of the vehicle and the second end 216 is located on an opposite end of the plate body 202 with respect to the longitudinal direction of the vehicle. In one instance, the first end 214 and/or the second end 216 are unitarily formed with the plate body 202, while in another instance, the first end 214 and/or the second end 216 are components formed separately from the plate body 202 that are later attached to the plate body 202.

As mentioned above, the underbody cover 200 is designed such that the underbody cover 200 does not significantly affect the impact performance of the vehicle. To accomplish this goal, the underbody cover 200 includes various attachment components that allow the underbody cover 200 to become disengaged from the frame 130 in the event of an impact involving the vehicle. The impact can be a front, side, and/or rear impact in which the vehicle itself impacts another object or in which another object impacts the vehicle. More specifically, in an impact, the underbody cover 200 disengages from the frame 130 and moves relative to the frame 130 such that the underbody cover 200 does not transmit the load of the impact. As mentioned above, various attachment components of the underbody cover 200 allow the underbody cover 200 to disengage from the frame 130 when the underbody cover 200 is in motion, thus limiting the force transmitted to the frame 130 by the impact, and thus lessening the effect on the impact performance of the vehicle.

The attachment components, in some instances, include one or more combinations of rigid attachment components and movable attachment components that function together to allow the underbody cover 200 to become disengaged from the frame 130. As used herein, "rigid" and "rigidly" mean that the underbody cover 200 does not substantially move with respect to the portion of the frame 130 to which the underbody cover 200 is rigidly attached. Likewise, as used herein, "movable" and "movably" mean that the underbody cover 200 is allowed to move with respect to the portion of the frame 130 to which the underbody cover 200 is movably attached. More specifically, in one or more configurations, the underbody cover 200 is rigidly attached to the crossbeam that moves first in an impact, and the underbody cover 200 is movably attached to the crossbeam that moves second in an impact. In the arrangement shown, the underbody cover 200 is rigidly attached to the first crossbeam 150A and movably attached to the second crossbeam 150B. Accordingly, the underbody cover 200 includes a first attachment component that rigidly attaches the underbody cover 200 to the first crossbeam 150A and a second attachment component that movably attaches the underbody cover 200 to the second crossbeam 150B. The first attachment component and/or the second attachment component may include one or more attachment points, components for attachment, and/or structural features that facilitate connection of the underbody cover 200 to the crossbeams 150.

As mentioned above, in one arrangement, the first end 214 is rigidly attached to the first crossbeam 150A. In one example, referring now to FIG. 2B, in order to rigidly attach to the first crossbeam 150A, the first end 214 includes an attachment plate 218. As shown, the attachment plate 218 is provided on the underside 212 of the plate body 202, but in other arrangements, the attachment plate 218 can be provided on the topside 210 of the plate body 202. In one instance, the attachment plate 218 is unitarily formed with the plate body 202, while in other instances, the attachment plate 218 is a separate component from the plate body 202 that is later attached to the plate body 202.

When the underbody cover 200 is installed to the frame 130, in one configuration, the attachment plate 218 contacts the first crossbeam 150A such that the attachment plate 218 is substantially flush with the first crossbeam 150A. To rigidly attach the underbody cover 200 to the first crossbeam 150A, the attachment plate 218 is attached to the first crossbeam 150A using attachment plate fasteners 220, such as bolts or screws, in the example shown. In other examples, the attachment plate 218 can be attached to the first crossbeam 150A by welding, adhesive, or another form of rigid attachment. By way of rigidly attaching the first end 214 to the first crossbeam 150A, the attachment plate 218 serves various purposes. In one example, the attachment plate 218 serves to rigidly attach the underbody cover 200 to the vehicle during normal use (e.g., when the vehicle is not involved in an impact) such that the underbody cover 200 does not move relative to the frame 130 and remains in place to protect various vehicle components supported by the frame 130, as mentioned above. In another example, the attachment plate 218 serves to rigidly attach the underbody cover 200 to the vehicle such that relative motion of the underbody cover 200 with respect to the first crossbeam 150A does not occur during an impact. The rigid attachment of the first end 214 to the first crossbeam 150A causes the first crossbeam 150A to push the plate body 202 toward the second crossbeam 150B in an impact such that the second end 216 can disengage from the second crossbeam 150B and substantially prevent a load from the impact from being transferred to the remainder of the frame 130.

As mentioned above, the first end 214 can include one or more attachment components that rigidly attach the plate body 202 to the first crossbeam 150A. Referring back to FIG. 2A, in addition to or alternatively from the attachment plate 218, the underbody cover 200, in one or more arrangements, includes a hook 222. The hook 222 can facilitate rigid attachment of the plate body 202 to the first crossbeam 150A. In the example shown, the hook 222 is provided on the topside 210 of the plate body 202 (in other words, in one configuration, the hook 222 is located substantially on the opposite side of the underbody cover 200 as the attachment plate 218). In arrangements in which the attachment plate 218 is provided on the topside 210 of the plate body 202, the hook 222 can be provided on the underside 212 of the plate body 202.

Like the attachment plate 218, the hook 222 serves various purposes. In one example, the hook 222 aids with installation of the underbody cover 200 to the frame 130. During installation, the hook 222 can temporarily hold the underbody cover 200 in place while the remaining fasteners, e.g., the attachment plate fasteners, are secured. In another example, the hook 222 helps transmit load during an impact. To facilitate load transmission during an impact, the hook 222 has a geometry that allows the first crossbeam 150A to push the underbody cover 200 in the longitudinal direction of the vehicle. More specifically, the hook 222 hooks around the first crossbeam 150A such that when the first crossbeam 150A moves in an impact, the first crossbeam 150A pushes against the hook 222, which then moves the underbody cover 200. In one example, the hook 222 includes two parallel portions (e.g., a first parallel portion 224A and a second parallel portion 224B), which are substantially parallel to the underbody cover 200, and a face 226, which is substantially perpendicular to the underbody cover 200. In this example, the first parallel portion 224A is attached to the underbody cover 200, and the second parallel portion 224B is attached to and/or rests on the first crossbeam 150A, while the face 226 abuts the first crossbeam 150A. Accordingly, when the first crossbeam 150A moves during an impact, the first crossbeam 150A pushes the face 226, thereby pushing the underbody cover 200 as well. In some instances, the hook 222 is a component that is formed separately from the underbody cover 200 for attachment to the underbody cover 200. In other instances, the hook 222 may be unitarily formed with the underbody cover 200.

It should be noted that, in some instances, load transmission during an impact may be not only facilitated by the design of the underbody cover 200 and the attachment components, but also, by one or more features of the frame 130 itself. For example, the frame rails 140 may include buckle sections 228 that cause the frame rails 140 to buckle in an impact involving the vehicle. The buckle sections 228, in the example shown, include a first buckle section 228A for the first frame rail 140A and a second buckle section 228B for the second frame rail 140B. The buckle sections 228 will be described in further detail below.

As mentioned above, the underbody cover 200 includes attachment components that allow relative movement of the underbody cover 200 with respect to the second crossbeam 150B. Referring to FIG. 2B, the second end 216 includes one or more break-away fasteners 300 and/or one or more keyhole fasteners 400 that movably attach the second end 216 to the second crossbeam 150B. Each of these types of attachment components is configured to permit movement of the second end 216 with respect to the second crossbeam 150B during an impact. In some instances, the attachment components work in tandem with the buckle sections 228 to transmit the load of an impact involving the vehicle. Each type of attachment component will be described in further detail below.

Referring now to FIGS. 3A and 3B, an example break-away fastener 300 is shown. FIG. 3A shows the break-away fastener 300 in an engaged configuration in which the break-away fastener 300 attaches the second end 216 to the second crossbeam 150B, while FIG. 3B shows the break-away fastener 300 in a disengaged configuration in which the break-away fastener 300 has fractured and causes the second end 216 to become disengaged from the second crossbeam 150B. In one arrangement, for example, as shown, the break-away fastener 300 includes a tab 310, a bridge 320, and a fastener (e.g., a bolt, a screw, etc., not shown) connecting the tab 310 to the second crossbeam 150B through a tab aperture 330. In one configuration, the tab 310 overlies the second crossbeam 150B and defines the tab aperture 330 that receives the fastener to connect the tab 310 to the second crossbeam 150B. The break-away fastener 300 also includes a bridge 320 connecting the tab 310 to the plate body 202. The tab 310 and/or bridge 320 can be unitarily formed with the plate body 202, or the tab 310 and/or bridge 320 can be formed separate from the plate body 202 for later attachment to the plate body 202.

When movement of the first crossbeam 150A pushes the plate body 202 toward the second crossbeam 150B, the load of the impact causes the bridge 320 to plastically deform and fracture. For example, the bridge 320 can fracture when the load exceeds a predetermined amount. When the bridge 320 fractures, the plate body 202 is able to move relative to the second crossbeam 150B. For example, once the bridge 320 has fractured, the second end 216 can move up and slide over the tab 310. Performance of the break-away fastener 300, and thus the predetermined amount of force necessary to fracture the bridge 320, is tunable by altering the bridge 320. For example, changing one or more dimensions of the bridge 320 can affect the force necessary to fracture the bridge 320. More specifically, in one example, the bridge 320 has a length, and shortening the length facilitates earlier fracturing of the bridge 320, while increasing the length delays fracturing of the bridge 320.

In some instances, the second crossbeam 150B and/or the tab 310 may define a recess. For example, as shown, the second crossbeam 150B defines a crossbeam recess 340 and the tab 310 defines a tab recess 350. The crossbeam recess

340, in some configurations, allows connection of other vehicle components to the second crossbeam 150B. In instances in which the second crossbeam 150B defines a crossbeam recess 340, the tab 310 of the break-away fastener 300 may also define a tab recess 350 having contours that substantially match contours of the crossbeam recess 340. The tab recess 350 can facilitate attachment of the tab 310 to the second crossbeam 150B.

Figure 4A:
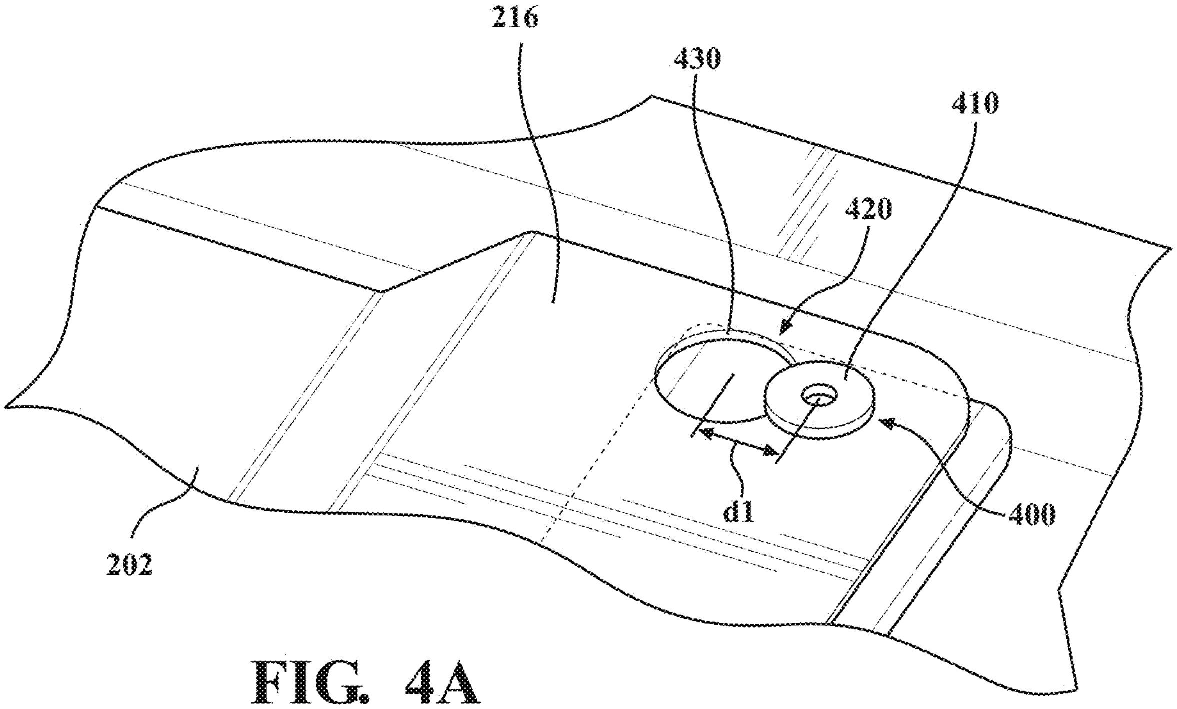
FIG. 4A illustrates one example of a top view of a keyhole fastener in an engaged configuration.
Figure 4B:
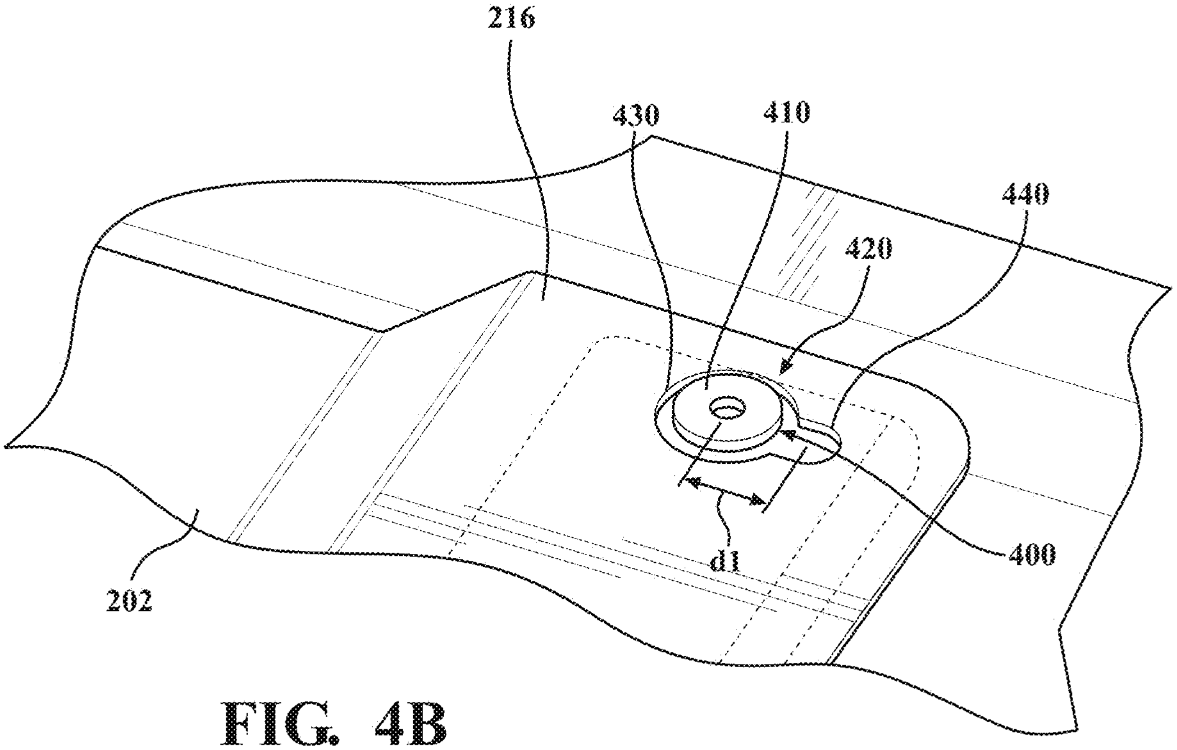
FIG. 4B illustrates one example of a top view of the keyhole fastener in a disengaged configuration.
Figure 4C:
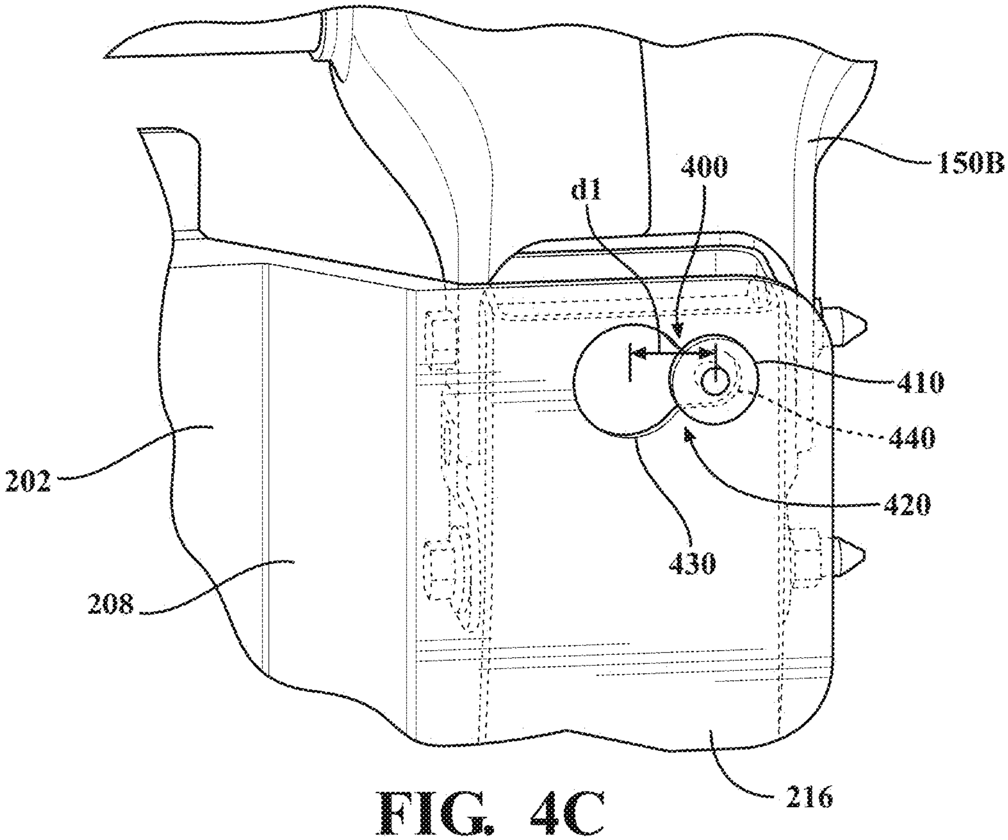
FIG. 4C illustrates one example of a bottom view of the keyhole fastener in the engaged configuration.
Figure 4D:
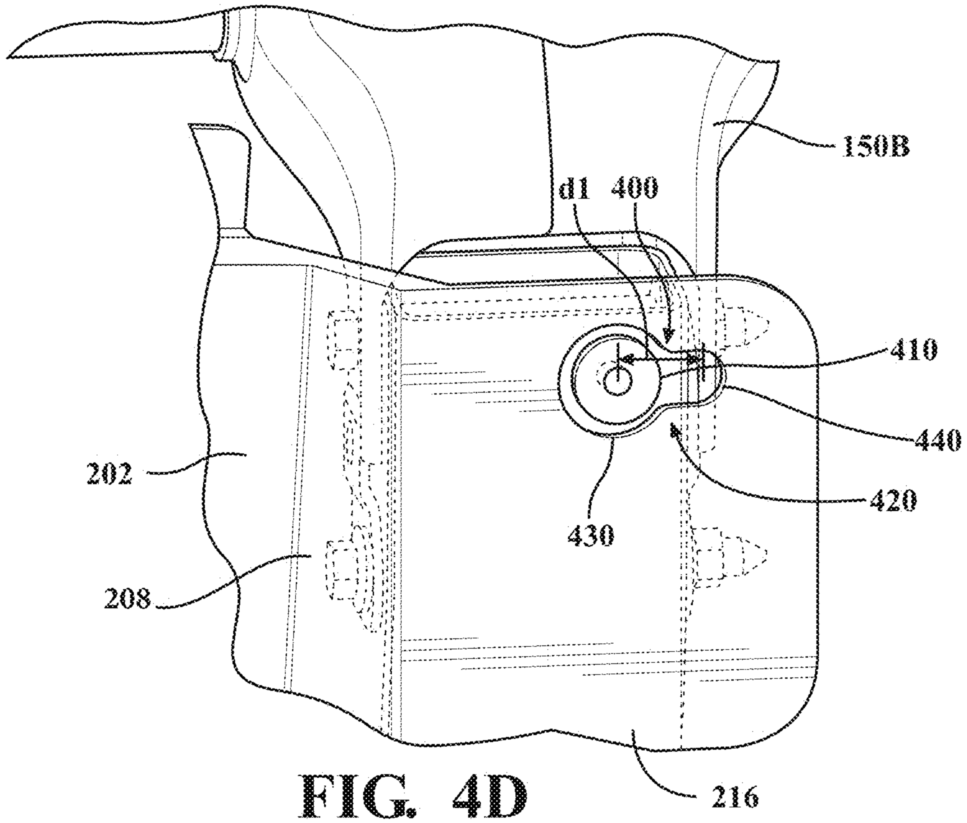
FIG. 4D illustrates one example of a bottom view of the keyhole fastener in the disengaged configuration.

Referring now to FIGS. 4A-4D, an example keyhole fastener 400 is shown. FIGS. 4A and 4B show top views of the keyhole fastener 400 in an engaged configuration and in a disengaged configuration, respectively. Contrariwise, FIGS. 4C and 4D show bottom views of the keyhole fastener 400 in the engaged configuration and the disengaged configuration, respectively. In the engaged configuration, the keyhole fastener 400 attaches the second end 216 to the second crossbeam 150B, while in the disengaged configuration, the keyhole fastener 400 does not attach the second end 216 to the second crossbeam 150B. In other words, in the disengaged configuration, the keyhole fastener 400 allows the second end 216 to move away from the second crossbeam 150B, as described in further detail below.

The keyhole fastener 400, in one arrangement, includes a fastener 410 (e.g., a bolt, a screw, etc.) and a keyhole aperture 420 through which the fastener 410 attaches the second end 216 to the second crossbeam 150B. In one configuration, the keyhole aperture 420 is defined by the second end 216. The keyhole aperture 420, in one example, includes a keyhole 430 and a slot 440. The keyhole 430, in one arrangement, has a larger diameter than a width of the slot 440. When the underbody cover 200 is installed to the frame 130, the second end 216 is attached to the second crossbeam 150B through the slot 440 in the engaged configuration as shown in FIGS. 4A and 4C, which allows for a high clamping force during normal vehicle use such that the underbody cover 200 remains attached to the second crossbeam 150B. During an impact, when the plate body 202 moves together with the first crossbeam 150A, movement of the plate body 202 pushes and applies a force to the second end 216. Once the force has exceeded a predetermined amount, for example, when the force exceeds the clamping force provided by the fastener 410, the second end 216 moves relative to the second crossbeam 150B, and the underbody cover 200 moves such that the fastener 410 becomes aligned with the keyhole 430 instead of the slot 440, as shown in FIGS. 4B and 4D. Because the keyhole 430 has a larger diameter than a width of the slot 440, once the fastener 410 is aligned with the keyhole, the second end 216 can move downward away from the second crossbeam 150B to become disengaged from the second crossbeam 150B, as the fastener 410 is no longer clamping the second end 216 to the second crossbeam 150B. This is described in further detail below in connection with FIG. 5. It should also be noted that the keyhole aperture 420 defines a bolt-to-bolt distance $d_1$. In one example, the bolt-to-bolt distance $d_1$ is defined by the distance between a center of the fastener 410 when the fastener 410 is attached through the slot 440 to a center of the fastener 410 when the fastener 410 is aligned with the keyhole 430. The bolt-to-bolt distance $d_1$ will also be explained in further detail below in connection with FIG. 5.

It should be understood that, in one configuration, for example, as shown, the second end 216 includes keyhole fasteners 400 as well as break-away fasteners 300. For example, as shown in FIG. 2B, the second end 216 includes two keyhole fasteners 400 and two break-away fasteners 300. However, it should be understood that, in other configurations, the second end 216 can include solely keyhole fasteners 400 or solely break-away fasteners 300. In some instances, it is advantageous to include both keyhole fasteners 400 and break-away fasteners 300 at the second end 216, as the keyhole fasteners 400 and the break-away fasteners 300 may perform differently from one another in an impact and may also facilitate attachment of the second end 216 to the second crossbeam 150B in different manners. For example, the keyhole fasteners 400 facilitate easy attachment of the second end 216 to the second crossbeam 150B while also providing a robust connection. In another example, the break-away fasteners 300 allow attachment of the second end 216 to the second crossbeam 150B at locations in which the second crossbeam 150B defines a crossbeam recess 340, as described above.

As briefly mentioned above, when the keyhole fastener 400 is in the disengaged configuration, the second end 216 can move downward away from the second crossbeam 150B to become disengaged from the second crossbeam 150B, as the fastener 410 is no longer clamping the second end 216 to the second crossbeam 150B. In some arrangements, the underbody cover 200 has a geometry that causes the second end 216 to move downward away from the second crossbeam 150B with respect to the vehicle when the keyhole fastener 400 is in the disengaged configuration. In one example, referring now to FIG. 5, the geometry of the underbody cover 200 includes the ramp 208, as mentioned above in connection with FIGS. 2A and 2B. In one configuration, the ramp 208, when pushed against the second crossbeam 150B, causes the second end 216 to move downward away from the second crossbeam 150B and become unattached to the second crossbeam 150B.

Figure 5:
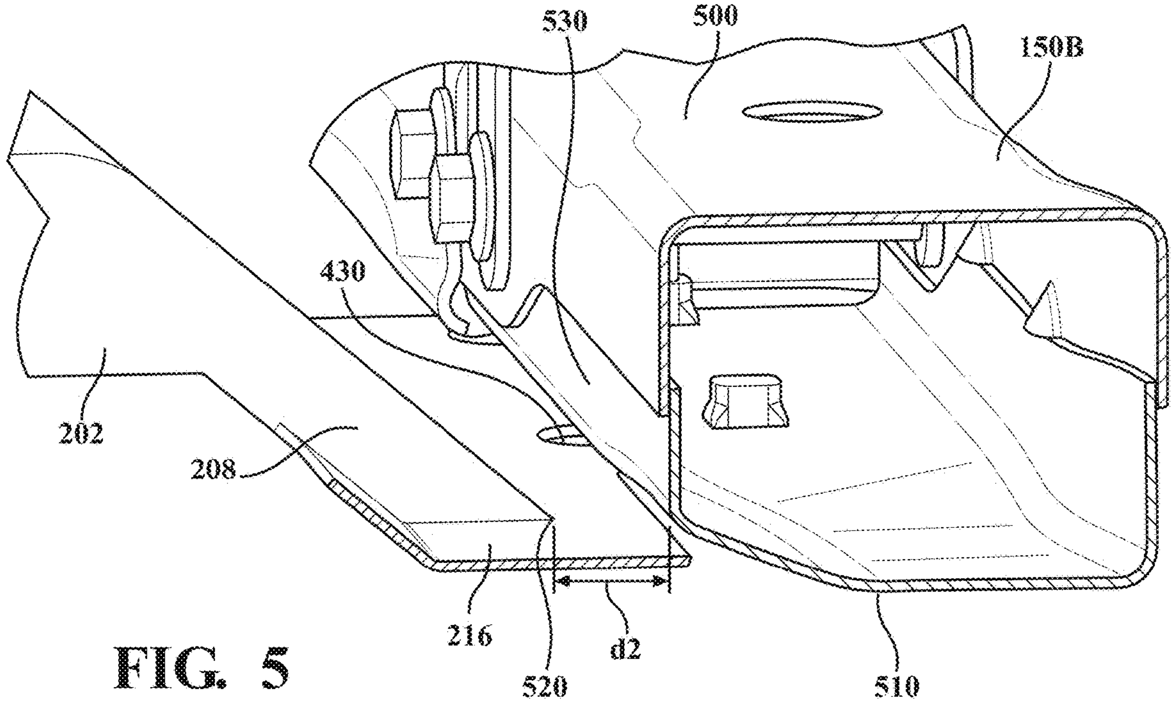
FIG. 5 illustrates one example of a sideview of a portion of the underbody cover.

More specifically, in one arrangement, with continued reference to FIG. 5, the ramp 208 has a shape relative to the vehicle and the second crossbeam 150B that facilitates movement of the second end 216 away from the crossbeam. In this configuration, the second crossbeam 150B defines a topside 500 and an underside 510. The underside 510, in one example, faces a ground surface on which the vehicle is parked or traveling, while the topside 500 faces substantially opposite the underside 510. In other words, the topside 500 faces up with respect to the vehicle. In this arrangement, the ramp 208 slopes in a downward direction from the topside 500 to the underside 510 and in a longitudinal direction of the vehicle from the first crossbeam 150A to the second crossbeam 150B. Accordingly, in this configuration, when the plate body 202 is pushed in an impact involving the vehicle, the second end 216 moves such that the keyhole fastener 400 becomes disengaged, the ramp 208 pushes against the second crossbeam 150B, and the ramp 208 causes the second end 216 to move away from the underside 510 of the second crossbeam 150B, thereby disengaging the second end 216 from the second crossbeam 150B.

Moreover, in some instances, the ramp 208 defines a ramp edge 520 where the ramp 208 meets the second end 216. The ramp edge 520 is offset from a side face 530 of the second crossbeam 150B, thereby defining a ramp edge 520 distance $d_2$. In some instances, the ramp edge 520 distance $d_2$ is substantially equal to the bolt-to-bolt distance $d_1$ mentioned above. In this way, when the fastener 410 of the keyhole fastener 400 is aligned with the keyhole 430, the ramp 208 begins to contact the second crossbeam 150B to push the second end 216 away from the second crossbeam 150B. Additionally, it should be noted that the ramp 208 defines an incline, which is a degree to which the ramp 208 is sloped. In some instances, a greater degree in incline causes the ramp 208 to push the second end 216 farther away from the second crossbeam 150B, while a lesser degree in incline causes the ramp 208 to push the second end 216 not as far away from the second crossbeam 150B when compared to a greater degree in incline.

In some instances, in addition to disengagement of the second end 216 from the second crossbeam 150B, crumpling of the plate body 202 may also help the underbody cover 200 to transmit load such that impact performance of the vehicle is not significantly affected. Accordingly, referring now to FIG. 6A, in one arrangement, the plate body 202 defines a crumple zone 600. In an impact, the crumple zone 600 facilitates bending of the plate body 202 to help further absorb a load transmitted to the plate body 202 during the impact. To create the crumple zone 600, in one arrangement, the plate body 202 includes a crease 610. The crease 610, in one configuration, is an area of the plate body 202 that has one or more different characteristics than the remainder of the plate body 202 that cause the plate body 202 to fold at the crease 610. In one example, the crease 610 is an area of the plate body 202 that has a higher rigidity with respect to the remainder of the plate body 202. In another example, the crease 610 is an area of the plate body 202 that has an increased thickness than the remainder of the plate body 202. In yet another example, the crease 610 is an area of the plate body 202 that is formed of a different material than the remainder of the plate body 202.

Figure 6A:
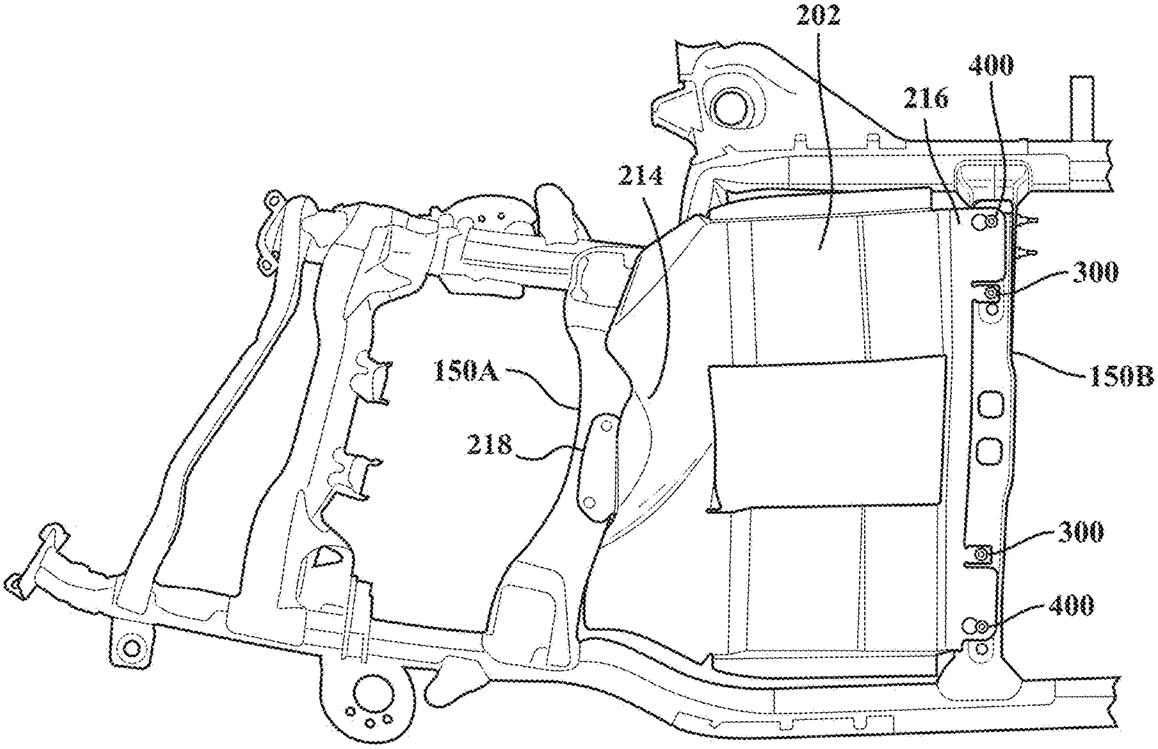
FIG. 6A illustrates one example of a top view of the underbody cover after an impact involving the vehicle.
Figure 6B:
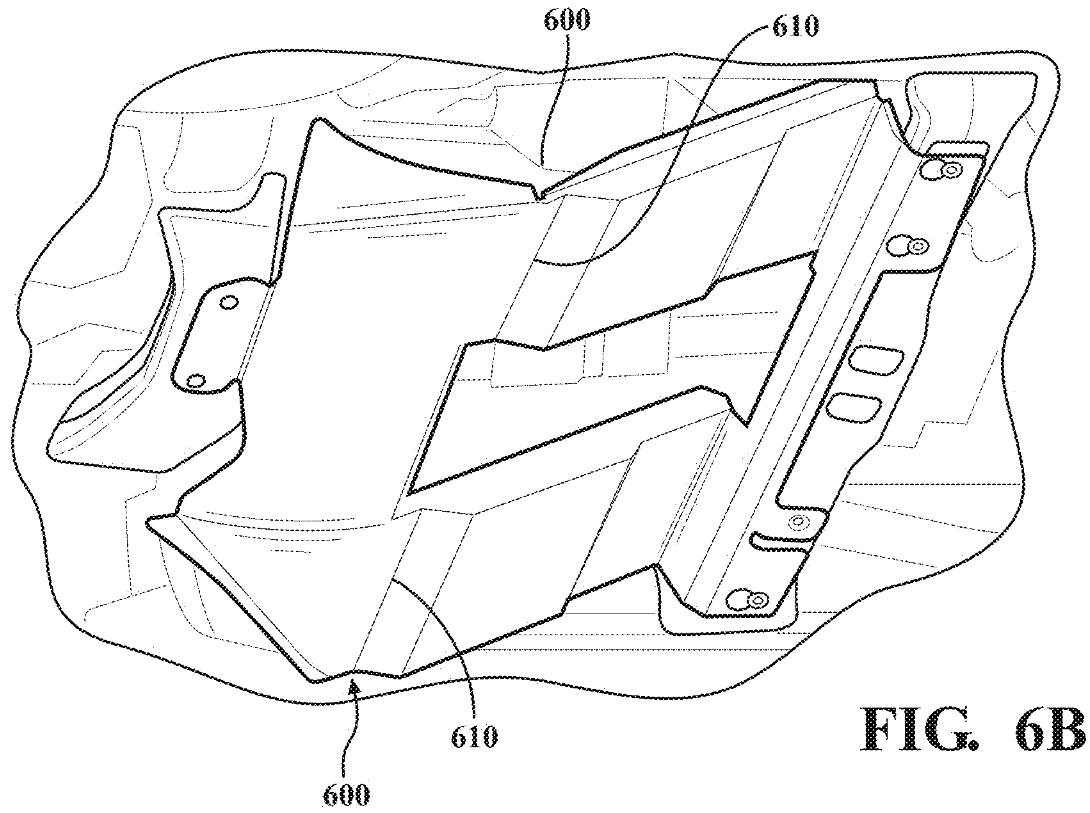
FIG. 6B illustrates one example of a bottom view of the underbody cover after an impact involving the vehicle.
Figure 6C:
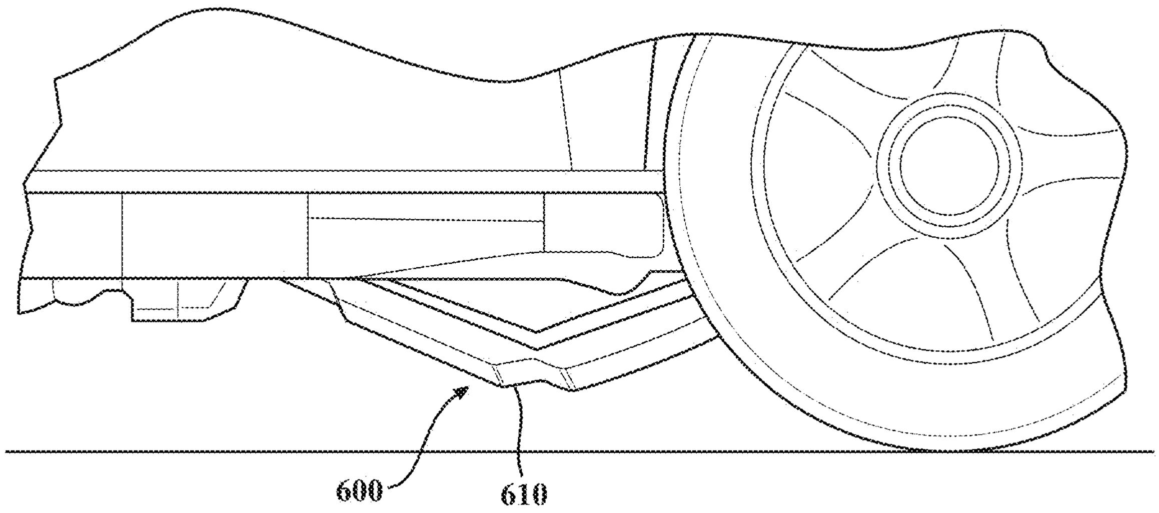
FIG. 6C illustrates one example of a side view of the underbody cover after an impact involving the vehicle.

Because of one or more of these characteristics, the crease 610 causes the plate body 202 to bend at the crumple zone 600 during an impact. Referring now to FIGS. 6B and 6C, the crease 610, in one arrangement, causes the plate body 202 to bend away from the underbody 110. More specifically, the crease 610 causes the plate body 202 to bend away from the underbody 110 such that the crease 610 moves down and away from the underbody 110 with respect to the vehicle, in other words, toward the ground surface on which the vehicle is parked or traveling.

As mentioned above, in some instances, the frame 130 includes buckle sections 228. In some configurations, the crease 610 is aligned with the buckle sections 228 to help the underbody cover 200 absorb an impact along with the frame 130 via the buckle sections 228. Referring back to FIGS. 2A and 2B, and as mentioned above, the first buckle section 228A and the second buckle section 228B, in one arrangement, are portions of the first frame rail 140A and the second frame rail 140B, respectively, that buckle in an impact in order to absorb a portion of the load. As shown in FIGS. 2A and 2B, in one configuration, the crease 610 extends across the underbody cover 200 between the first buckle section 228A and the second buckle section 228B. Accordingly, in such a configuration, in an impact involving the vehicle, the first crossbeam 150A moves first and pushes the underbody cover 200 by the first end 214 toward the second crossbeam 150B. After the first crossbeam 150A moves, the buckle sections 228 buckle and the underbody 110 bends along the crease 610. After the buckle sections 228 buckle and the underbody 110 bends along the crease 610, the second end 216 moves with respect to the second crossbeam 150B to disengage from the second crossbeam 150B. While this configuration is described as placing the crease 610 in between the buckle sections 228, it should be understood that the crease 610, in other configurations, is located elsewhere on the underbody cover 200 between the first crossbeam 150A and the second crossbeam 150B. In any case, the crease provides the additional benefit of causing the underbody cover to move away from the underbody during an impact involving the vehicle, thereby further ensuring that the load from the impact is not transmitted to the frame through the underbody cover.

The arrangements described herein have the benefit of providing a vehicular underbody cover that does not significantly affect impact performance of vehicles. Additionally, the underbody cover also provides the advantage of protecting one or more vehicle components supported by the frame, such as a catalytic converter, and/or by functioning as a skid plate. In these instances, attachment components of the underbody cover provide the advantage of rigidly attaching the underbody cover to the frame during normal use to provide such protection, while also disengaging from the frame to prevent transmission to the frame of a load during an impact involving the vehicle. Accordingly, the underbody cover provides the advantage of protecting one or more vehicle components while not significantly affecting the impact performance of the vehicle.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6C, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ," as used herein, refers to and encompasses any and all possible combinations of one or more of the associated listed items. As an example, the phrase "at least one of A, B, and C" includes A only, B only, C only, or any combination thereof (e.g., AB, AC, BC, OR ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some examples, "substantially" can include being within normal manufacturing tolerances.

In this description, uses of "front," "forward," and the like, and uses of "rear," "rearward," and the like, refer to the longitudinal directions of the vehicle. "Front," "forward," and the like refer to the front (fore) of the vehicle, while "rear," "rearward," and the like refer to the back (aft) of the vehicle. Uses of "side," "sideways," "transverse," and the like refer to the lateral directions of the vehicle. Uses of "above," "below," and the like refer to the vertical directions of the vehicle.

In this description, the vehicle includes an exterior and a number of interior compartments. In one arrangement, the vehicle includes a body that forms the exterior and defines or otherwise encloses the compartments. In some instances, the body includes a first side, a second side, a floor, a front end, a rear end, and the like. In one example, the body is constructed from a combination of rigidly interconnected frame members, panels, and other body elements, as well as a combination of overlying paneling, trim, upholstery, and other body coverings. In some instances, the body elements have a combination of fabricated, bent, stamped, extruded, cast, molded, and like constructions, and are made from a combination of metallic, polymeric, and like materials.

In this description, in one arrangement, the compartments of the vehicle include a passenger compartment, an engine compartment, a cargo area, and the like. Among other things, in one arrangement, the vehicle includes seats, a dash assembly, an instrument panel, controls, and the like housed in the passenger compartment. Additionally, in some instances, the vehicle may include an engine, a motor, a transmission, and the like, as well as other powertrain components, such as wheels, housed in the engine compartment and elsewhere in the vehicle. The wheels support the remainder of the vehicle on the ground. One, some, or all of the wheels are powered by the remainder of the powertrain components to drive the vehicle along the ground.

Aspects herein can be embodied in other forms without departing from the spirit or essential attributes thereof. Accordingly, reference should be made to the following claims, rather than to the foregoing specification, as indicating the scope thereof.

What is claimed is:

1. An underbody cover, comprising:

a plate body that attaches to an underbody of a vehicle, the underbody including a first crossbeam and a second crossbeam spaced from the first crossbeam in a longitudinal direction of the vehicle, the plate body defining a first end that attaches to the first crossbeam and a second end opposite the first end that attaches to the second crossbeam;

a first attachment component that rigidly attaches the first end to the first crossbeam; and a second attachment component that movably attaches the second end to the second crossbeam and allows the second end to disengage from the second crossbeam in an impact involving the vehicle, thereby preventing transmission to the vehicle through the underbody cover of a load from the impact.

2. The underbody cover of claim 1, wherein the first attachment component includes an attachment plate that rigidly attaches the plate body to the first crossbeam such that the first end moves together with the first crossbeam, wherein the attachment plate substantially prevents relative movement of the plate body with respect to the first crossbeam.

3. The underbody cover of claim 1, wherein the first attachment component includes a hook connected to the plate body, wherein the hook has a face that abuts the first crossbeam such that when the first crossbeam moves, the face pushes against the first crossbeam, thereby causing the first crossbeam to push the plate body toward the second crossbeam.

4. The underbody cover of claim 1, wherein the second end includes a keyhole fastener including a keyhole aperture defining a keyhole and a slot, wherein the second end is connected to the second crossbeam by a fastener through the slot, and wherein, in an impact involving the vehicle, the second end moves relative to the second crossbeam such that the keyhole aligns with the fastener to permit disengagement of the second end from the second crossbeam.

5. The underbody cover of claim 1, wherein the second end includes a break-away fastener including a tab connected to the second crossbeam and a bridge connecting the tab to the plate body, and wherein, in an impact involving the vehicle, the second end is pushed by the plate body such that the bridge fractures and permits disengagement of the second end from the second crossbeam.

6. The underbody cover of claim 1, wherein the second crossbeam defines an underside facing a ground surface on which the vehicle is traveling and a topside facing opposite the underside, wherein the plate body further defines a ramp between the first crossbeam and the second crossbeam that slopes in a direction from the topside to the underside such that when the second end disengages from the second crossbeam, the second crossbeam pushes the plate body away from the underbody along the ramp.

7. The underbody cover of claim 1, wherein the plate body defines a crease between the first crossbeam and the second crossbeam, wherein the crease has an increased rigidity with respect to a remainder of the underbody cover, and wherein, in an impact, the crease causes the underbody cover to crumple along the crease and deform in a direction away from the underbody.

8. The underbody cover of claim 1, wherein the first crossbeam moves first in an impact involving the vehicle and the second crossbeam moves second in an impact involving the vehicle, and wherein the first crossbeam is located toward an aft of the vehicle and wherein the second crossbeam is located toward a fore of the vehicle.

9. An underbody cover, comprising:

a plate body that attaches to an underbody of a vehicle, the underbody including a first crossbeam and a second crossbeam spaced from the first crossbeam in a longitudinal direction of the vehicle, the plate body defining a first end that attaches to the first crossbeam and a second end opposite the first end that attaches to the second crossbeam;

a first attachment component that rigidly attaches the first end to the first crossbeam; and a second attachment component that movably attaches the second end to the second crossbeam and allows the second end to disengage from the second crossbeam, the second attachment component including:

a keyhole fastener including a keyhole aperture defining a keyhole and a slot, the second end being connected to the second crossbeam by a fastener through the slot; and a break-away fastener including a tab connected to the second crossbeam and a bridge connecting the tab to the plate body, and wherein, in an impact involving the vehicle, the second end is pushed by the plate body by movement of the first crossbeam such that the bridge fractures and permits disengagement of the second end from the second crossbeam, thereby preventing transmission to the vehicle through the underbody cover of a load from the impact.

10. The underbody cover of claim 9, wherein the first attachment component includes an attachment plate that rigidly attaches the plate body to the first crossbeam such that the first end moves together with the first crossbeam, wherein the attachment plate substantially prevents relative movement of the plate body with respect to the first crossbeam.

11. The underbody cover of claim 9, wherein the first attachment component includes a hook connected to the plate body, wherein the hook has a face that abuts the first crossbeam such that when the first crossbeam moves, the face pushes against the first crossbeam pushes to push the plate body toward the second crossbeam.

12. The underbody cover of claim 9, wherein the second crossbeam defines an underside facing a ground surface on which the vehicle is traveling and a topside facing opposite the underside, wherein the plate body further defines a ramp between the first crossbeam and the second crossbeam that slopes in a direction from the topside to the underside such that when the second end disengages from the second crossbeam, the second crossbeam pushes the plate body away from the underbody along the ramp.

13. The underbody cover of claim 9, wherein the plate body defines a crease between the first crossbeam and the second crossbeam, wherein the crease has an increased rigidity with respect to a remainder of the underbody cover, and wherein, in an impact, the crease causes the underbody cover to crumple along the crease and deform in a direction away from the underbody.

14. The underbody cover of claim 9, wherein the first crossbeam moves first in an impact involving the vehicle and the second crossbeam moves second in an impact involving the vehicle, and wherein the first crossbeam is located toward an aft of the vehicle and wherein the second crossbeam is located toward a fore of the vehicle.

15. An underbody for a vehicle, comprising:

a pair of lateral crossbeams including a first crossbeam and a second crossbeam spaced from the first crossbeam in a longitudinal direction of the vehicle;

a pair of longitudinal frame rails each defining a buckle section located between the first crossbeam and the second crossbeam; and a plate body that attaches to the underbody between the longitudinal frame rails and between the lateral crossbeams, the plate body defining a first end that attaches to the first crossbeam and a second end opposite the first end that attaches to the second crossbeam, the plate body including:

a first attachment component that rigidly attaches the first end to the first crossbeam; and a second attachment component that movably attaches the second end to the second crossbeam and allows the second end to disengage from the second crossbeam in an impact involving the vehicle, thereby preventing transmission to the vehicle through the underbody cover of a load from the impact.

16. The underbody of claim 15, wherein the plate body defines a crease extending between the buckle sections, wherein the crease has an increased rigidity with respect to a remainder of the plate body, and wherein, in an impact involving the vehicle, the crease causes the plate body to crumple along the crease and deform in a direction away from the underbody.

17. The underbody of claim 16, wherein, in an impact involving the vehicle, the first crossbeam moves first and pushes the plate body by the first end toward the second crossbeam, wherein after the first crossbeam moves, the buckle sections buckle and the plate body crumples along the crease, and wherein, after the buckle sections buckle and the plate body crumples along the crease, the second end moves with respect to the second crossbeam until a load of the impact exceeds a predetermined amount, causing the second end to disengage from the second crossbeam.

18. The underbody of claim 15, wherein the second attachment component includes:

a keyhole fastener including a keyhole aperture defining a keyhole and a slot, wherein the second end is attached to the second crossbeam by a first fastener through the slot; and a break-away fastener including a tab connected to the second crossbeam by a second fastener and a bridge connecting the tab to the plate body, wherein the second end is movably connected to the second end such that when the first crossbeam pushes the plate body by the first end, the second end moves relative to the second crossbeam and disengages from the second crossbeam.

19. The underbody of claim 15, wherein the second crossbeam defines an underside facing a ground surface on which the vehicle is traveling and a topside facing opposite the underside, wherein the plate body further defines a ramp between the first crossbeam and the second crossbeam that slopes in a direction from the topside to the underside such that when the second end disengages from the second crossbeam, the second crossbeam pushes the plate body away from the underbody along the ramp.

20. The underbody of claim 15, wherein the first crossbeam is located toward an aft of the vehicle and wherein the second crossbeam is located toward a fore of the vehicle.

* * * * *